United States Patent
Momoki (10) Patent No.: US 9,470,903 B2
(45) Date of Patent: Oct. 18, 2016

(54) IMAGE CAPTURING APPARATUS

(71) Applicant: CANON KABUSHIKI KAISHA, Tokyo (JP)

(72) Inventor: Kazuhiko Momoki, Koshigaya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/684,534

(22) Filed: Apr. 13, 2015

(65) Prior Publication Data

US 2015/0301238 A1  Oct. 22, 2015

(30) Foreign Application Priority Data

Apr. 17, 2014 (JP) ................................. 2014-085278
Apr. 10, 2015 (JP) ................................. 2015-081236

(51) Int. Cl.
*H04N 5/225* (2006.01)
*G02B 13/16* (2006.01)
*G02B 27/46* (2006.01)

(52) U.S. Cl.
CPC .................................... *G02B 27/46* (2013.01)

(58) Field of Classification Search
CPC ...... H04N 5/23212; G02B 5/20; G02B 7/28; G02B 7/36; G03B 13/36
USPC ............ 348/222.1, 360, 335, 345, 348, 350, 348/352; 396/104, 121, 128
See application file for complete search history.

(56) References Cited

U.S. PATENT DOCUMENTS

| | | | |
|---|---|---|---|
| 6,124,972 A | 9/2000 | Hayakawa et al. | |
| 6,373,639 B2 | 4/2002 | Hayakawa et al. | |
| 6,563,643 B2 | 5/2003 | Hayakawa et al. | |
| 6,646,803 B2 | 11/2003 | Hayakawa et al. | |
| 7,551,221 B2 | 6/2009 | Sasaki | |
| 2006/0139476 A1 | 6/2006 | Sasaki | |
| 2009/0316002 A1* | 12/2009 | Ishiga | H04N 17/002 348/187 |
| 2010/0188558 A1* | 7/2010 | Gamadia | H04N 5/23212 348/345 |

FOREIGN PATENT DOCUMENTS

| | | |
|---|---|---|
| JP | 10-054960 A | 2/1998 |
| JP | 2006-145939 A | 6/2006 |

* cited by examiner

*Primary Examiner* — Yogesh Aggarwal
(74) *Attorney, Agent, or Firm* — Fitzpatrick, Cella, Harper & Scinto (57) ABSTRACT

The image capturing apparatus includes an optical low-pass filter configured to separate one incident ray into multiple rays to form multiple point images, and an image sensor configured to photoelectrically convert the multiple point images. The optical low-pass filter satisfies a condition of $0.4<2\times\sigma/P<0.9$. P represents a pixel pitch of the image sensor, and $\sigma$ represents a standard deviation of a distribution of the multiple point images.

10 Claims, 9 Drawing Sheets

IMAGE CAPTURING APPARATUS

BACKGROUND OF THE INVENTION

1. Field of the Invention

The present invention relates to an image capturing apparatus including an optical low-pass filter.

2. Description of the Related Art or video cameras using a two-dimensional image sensor (image pickup element) such as a CCD sensor or a CMOS sensor are incapable of acquiring image information of a frequency higher than a Nyquist frequency of the image sensor and thereby generate false color and moire fringe. For this reason, such image capturing apparatuses use an optical low-pass filter in order to prevent generation of the false color and moire fringe by limiting receipt of the high-frequency-image information.

Japanese Patent Laid-Open No. 10-54960 discloses an optical low-pass filter configured to separate an incident ray into four rays, by using a horizontal-separation birefringent plate and a vertical-separation birefringent plate, to form four point images. This optical low-pass filter utilizes a parallel plate having an effect of separating polarized rays from each other; the effect is provided by an oblique optic axis of a birefringent crystal. When a (μm) represents a separation width of the point images formed by this optical low-pass filter, the filter has a spatial frequency characteristic with a first cut-off spatial frequency of 1/(2a) at which contrast first disappears. Therefore, the separation width a is set such that the cut-off spatial frequency is near the Nyquist frequency of an image sensor. Such an optical low-pass filter is currently used for many single-reflex digital cameras.

On the other hand, Japanese Patent Laid-Open No. 2006-145939 discloses an optical low-pass filter configured to vary, depending on a position on a birefringent optical element where an incident ray enters, a separation width of separated rays to cut a high spatial frequency component. Birefringent optical elements having a larger thickness provide a larger separation width, that is, birefringent optical elements having a smaller thickness provide a smaller separation width. From this characteristic, the birefringent optical element disclosed in Japanese Patent Laid-Open No. 2006-145939 changes its thickness depending on the ray entrance position to vary the separation width. In addition, the birefringent optical element disclosed in Japanese Patent Laid-Open No. 2006-145939 spreads a distribution of the separation widths of the separated rays (point images) to cut a spatial frequency component in a broader range including a high frequency component. It is predicted that, in this optical low-pass filter, a distribution of the separation widths like a Gaussian distribution will make a separation width of entire incident rays having a certain width equivalent to that of point images distributed in the Gaussian distribution.

However, when using the optical low-pass filter disclosed in Japanese Patent Laid-Open No. 10-54960, a high contrast appears at a spatial frequency approximately twice of the first cut-off spatial frequency. For this reason, lens-interchangeable digital cameras having no lens resolution limitation cannot prevent the false color and the moire fringe from being generated in a high frequency band.

On the other hand, the optical low-pass filter disclosed in Japanese Patent Laid-Open No.2006-145939 has problems caused by its configuration in which the thickness of the birefringent optical element is varied depending on the ray entrance position. First, a reduction in diameter of the incident rays, that is, an increase in an F-number causes the incident rays to enter a region of the filter having a uniform thickness, which accordingly makes the separation width uniform. In this case, the optical low-pass filter disclosed in Japanese Patent Laid-Open No.2006-145939 becomes a filter merely having different spatial frequency characteristics depending on the ray entrance position and thus may generate the false color and the moire fringe at some ray entrance positions. In order to form the spread distribution of the separation widths of the point images, it is necessary to increase the diameter of the incident rays to a certain extent.

Secondly, in order to provide a distribution to the separation widths, the birefringent optical element needs to have a thickness variation of approximately several tens of percent. When a pixel pitch of an image sensor is several to several tens of micrometers, the birefringent optical element needs to have a thickness of several hundreds of micrometers. For this reason, the thickness of several hundreds of micrometers needs to be varied within a range of several tens of percent depending on the ray entrance position. This thickness variation is, however, far larger compared with a permissible variation in depth of focus of an optical system for image capturing, the depth of focus being several tens of micrometers. Therefore, this thickness variation of the birefringent optical element significantly affects an image capturing performance of the optical system.

SUMMARY OF THE INVENTION

The present invention provides an image capturing apparatus capable of suppressing generation of false color and moire fringe in a spatial frequency band around or higher than a Nyquist frequency regardless of an F-number and an entrance position of incident rays.

The present invention provides as an aspect thereof an image capturing apparatus including an optical low-pass filter configured to separate one incident ray into multiple rays to form multiple point images, and an image sensor configured to photoelectrically convert the multiple point images. The optical low-pass filter satisfies the following condition:

$$0.4 < 2 \times \sigma/P < 0.9$$

where P represents a pixel pitch of the image sensor, and σ represents a standard deviation of a distribution of the multiple point images.

Further features of the present invention will become apparent from the following description of exemplary embodiments (with reference to the attached drawings).

DESCRIPTION OF THE EMBODIMENTS

Exemplary embodiments of the present invention will be described below with reference to the attached drawings.

Embodiment 1

Figure 1:
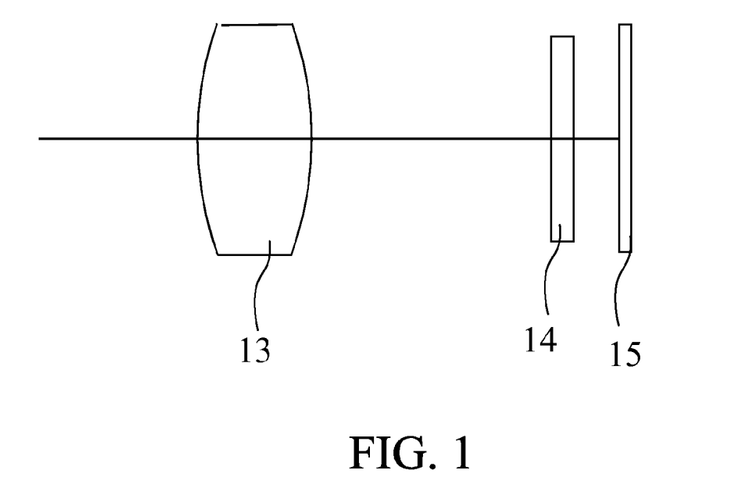
FIG. 1 illustrates a configuration of a digital camera including an optical low-pass filter that is Embodiment 1 of the present invention.

FIG. 1 illustrates a configuration of an image capturing unit of a digital camera that is a first embodiment (Embodiment 1) of the present invention which uses an optical low-pass filter. Light entering an image capturing lens 13 from an object (not illustrated) reaches a two-dimensional image sensor (image pickup element) 15 such as a CCD sensor or a CMOS sensor through an optical low-pass filter 14. The optical low-pass filter 14 provides a low-pass filter effect that influences an image capturing performance of an image capturing optical system constituted by the image capturing lens 13 and the optical low-pass filter 14. The image sensor 15 photoelectrically converts (captures) an object image (optical image) formed by the light passing through the optical low-pass filter 14 and subjected to the low-pass filter effect.

Figure 2:
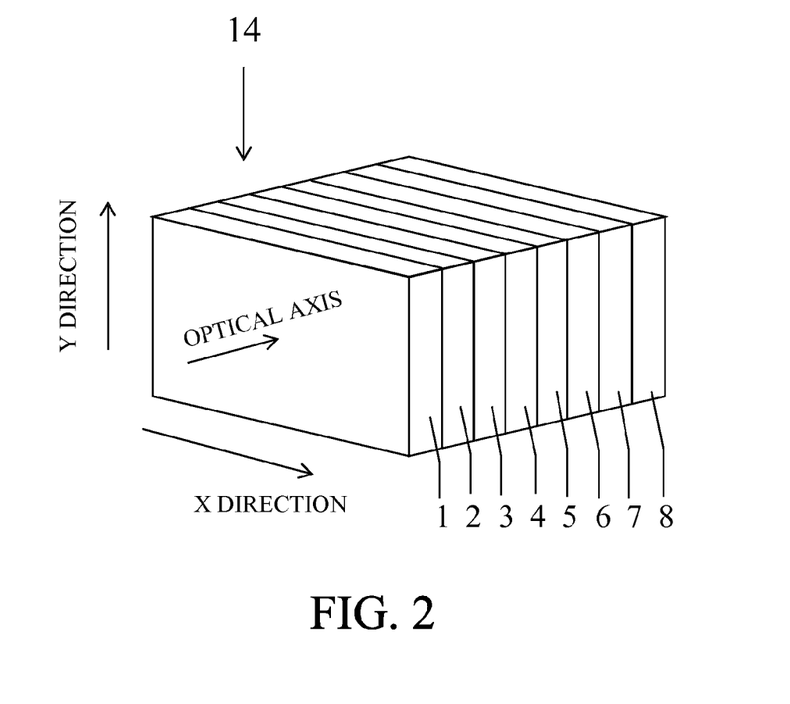
FIG. 2 illustrates a configuration of the optical low-pass filter of Embodiment 1.

FIG. 2 illustrates a configuration of the optical low-pass filter 14 in this embodiment. The optical low-pass filter 14 is constituted by rectangular birefringent optical elements 1 to 8 laminated in eight layers; each birefringent optical element has a same shape as that of an image pickup plane of the image sensor 15. These eight layer birefringent optical elements 1 to 8 are combined to provide a characteristic of the optical low-pass filter 14.

As illustrated in FIG. 2, an axis extending in a long-side direction (horizontal direction) of the image sensor 15 is defined as an x axis, and a direction thereof is defined as an x direction. In addition, an axis extending in a short-side direction (vertical direction) of the image sensor 15 is defined as a y axis, and a direction thereof is defined as a y direction. Furthermore, a plane along the x and y axes is referred to as "an x-y plane". An axis orthogonal to the x-y plane is referred to as "an optical axis", and a direction in which the optical axis extends is defined as an optical axis direction.

Figure 3A:
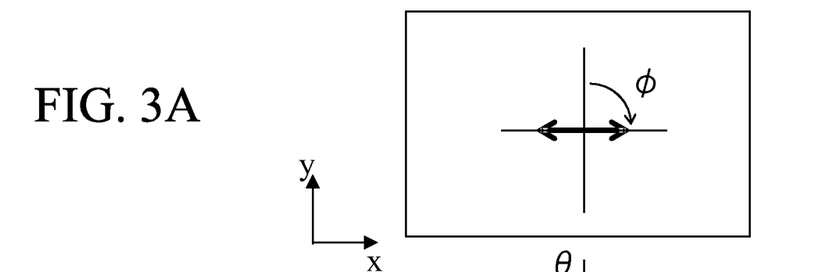
FIGS. 3A to 3D illustrates a direction of an optic axis of a uniaxial birefringent optical element constituting the optical low-pass filter of Embodiment 1 and ray separation by the optical element.
Figure 3B:
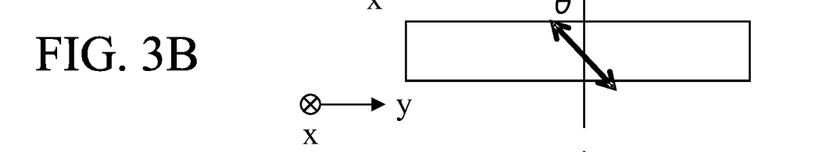

For explanatory purposes, in the drawing, each birefringent optical element has, in the optical axis direction, a thickness thicker than its actual thickness of several hundred micrometers. Each birefringent optical element has a structure illustrated in FIGS. 3A to 3D. Each birefringent optical element is composed of a uniaxial crystal (anisotropic material), such as crystal or lithium niobate, whose optic axis is tilted with respect to the x-y plane. As illustrated in FIG. 3A, when each birefringent optical elements is viewed from above the x-y plane (from the optical axis direction), the optic axis of each uniaxial crystal extends toward an azimuth $\psi=90°$ with respect to the y axis. On the other hand, as illustrated in FIG. 3B, when each birefringent optical element is viewed horizontally (from the x direction), the optic axis of each uniaxial crystal is tilted with respect to the optical axis by an angle $\theta$. The angle $\theta$ is set to an angle of approximately $45\pm20$ degrees. In general, a ray entering a parallel plate whose optic axis extends obliquely is separated into two rays (two points).

Figure 3C:
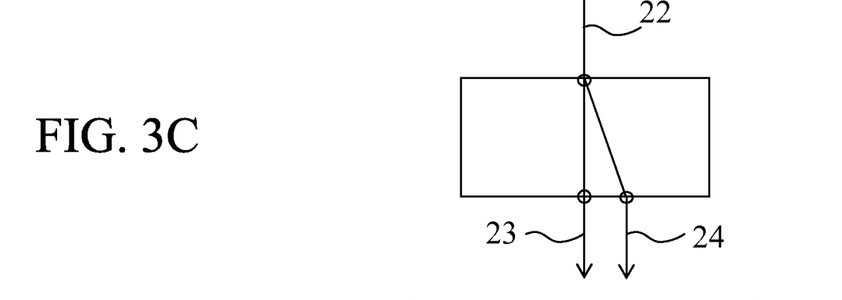
Figure 3D:
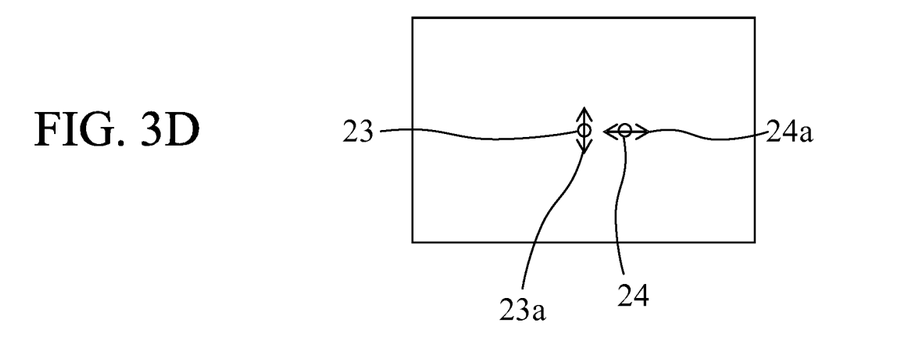

As illustrated in FIG. 3C, when one ray (incident ray) 22 enters each birefringent optical element from the optical axis direction, an ordinary ray 23 thereof is transmitted straight through the birefringent optical elements, and an extraordinary ray 24 thereof is separated from the ordinary ray 23 inside the birefringent optical element in a direction illustrated in the drawing. The ordinary ray 23 becomes a polarized ray whose electric field oscillates in a direction orthogonal to the separation direction in which the ordinary ray 23 and the extraordinary ray 24 are separated from each other, and the extraordinary ray 24 becomes a polarized ray whose electric field oscillates in the separation direction. That is, as illustrated in FIG. 3D, a polarization direction 23a of the ordinary ray 23 and a polarization direction 24a of the extraordinary ray 24 are orthogonal to each other. A separation width between the ordinary ray 23 and the extraordinary ray 24 uniquely depends on the tilt angle $\theta$ of the optic axis with respect to the optical axis and a thickness d of the birefringent optical element as a parallel plate. On the other hand, a combination of the tilt angle $\theta$ and the thickness d which provides an identical separation width is freely selectable. Therefore, in the following description, each birefringent optical element is expressed by using a separation direction $\psi$ and a separation width L of separated rays (i.e., of point images formed by the separated rays). The separation direction and the separation width of the separated rays are hereinafter referred to also as "a ray separation direction" and "a ray separation width", respectively.

Figure 4:
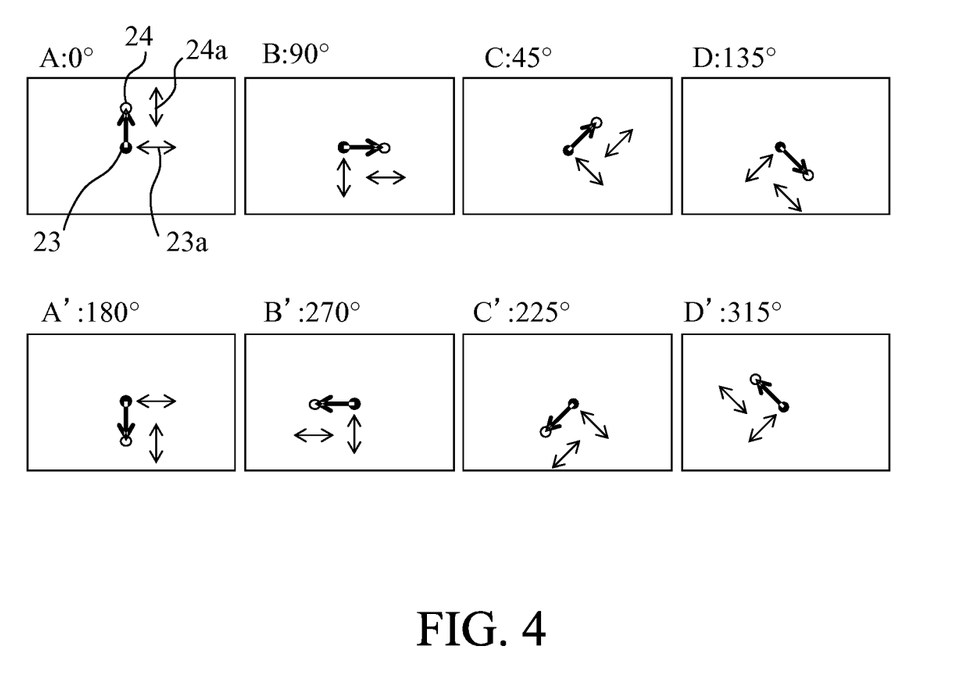
FIG. 4 illustrates ray separation directions of eight birefringent optical elements in Embodiment 1.

FIG. 4 and Table 1 illustrate, as DIRECTIONS 1 to 4, four example combinations of the ray separation directions of the birefringent optical elements (hereinafter each referred to also simply as "an element") 1 to 8 forming the eight layers and constituting the optical low-pass filter 14. In all of the example combinations, the ray separation width is set to an identical width L1, and an angle of the ray separation direction is defined as an angle about the y axis in a clockwise direction. A ray separation direction (simply shows as DIRECTION in Table 1) A represents a ray separation direction in which, of the incident ray from the optical axis direction, the ordinary ray as the polarized ray whose polarization direction is the x direction is transmitted straight through the element and the extraordinary ray as the polarized light whose polarization direction is the y direction is separated from the ordinary ray in an azimuth of 0°. Since a ray separation direction of 180° opposite to the ray separation direction A can be regarded as being equivalent to the ray separation direction A, the opposite ray separation direction is represented by a ray separation direction A'.

Similarly, a ray separation direction B corresponds to an azimuth of 90°, a ray separation direction B' corresponds to an azimuth of 270°, a ray separation direction C corresponds to an azimuth of 45°, a ray separation direction C' corresponds to an azimuth of 225°, a ray separation direction D corresponds to an azimuth of 135°, and a ray separation direction D' corresponds to an azimuth of 315°.

TABLE 1

| | DIRECTION 1 | DIRECTION 2 | DIRECTION 3 | DIRECTION 4 | SEPARATION WIDTH L |
|---|---|---|---|---|---|
| 1 | A  | A  | A  | A | L1 |
| 2 | C  | D  | C  | C | L1 |
| 3 | B  | B  | A' | B | L1 |
| 4 | D  | C  | C' | D | L1 |
| 5 | A' | B' | B  | A | L1 |
| 6 | C' | C' | D  | C | L1 |
| 7 | B' | A' | B' | B | L1 |
| 8 | D' | D' | D' | D | L1 |

Description will now be made of the ray separation directions. Since a distribution of separated point images has symmetry, it is desirable that the ray separation directions be four directions symmetric to one another. Accordingly, in this embodiment, the ray is separated twice in each of the ray separation directions (two mutually equivalent ray separation directions). That is, the ray is separated twice in the paired ray separation directions A and A', twice in the paired ray separation directions B and B', twice in the paired ray separation directions C and C' and twice in the paired ray separation directions D and D'. The ray separation directions A, A', B and B' are collectively referred to as "a 90°-azimuth group", and the ray separation directions C, C', D and D' are collectively referred to as "a 45°-azimuth group". In addition, the birefringent optical element whose ray separation direction is included in the 90°-azimuth group is hereinafter referred to as "an element of the 90°-azimuth group", and the birefringent optical element whose ray separation direction is included in the 45°-azimuth group is hereinafter referred to as "an element of the 45°-azimuth group".

In order to sequentially separate the ray by utilizing a polarization separation effect of the birefringent optical elements, the elements of the 90°-azimuth group and the elements of the 45°-azimuth group are needed to be alternately (that is, mutually adjacently) arranged. For this reason, as illustrated in Table 1, A or A' and B or B' of the 90°-azimuth group are allocated twice to each of the elements 1, 3, 5 and 7, and C or C' and D or D' of the 45°-azimuth group are allocated twice to each of the elements 2, 4, 6 and 8.

The reason for mutually adjacently arranging the elements of the 90°-azimuth group and the elements of the 45°-azimuth group is as follows. The ray entering the element of the 90°-azimuth group is separated into two polarized rays whose polarization directions are mutually orthogonal, that is, into the ordinary and extraordinary rays. The polarization directions of the two polarized rays respectively coincide with the ray separation direction of the 90°-azimuth group. Then, the two polarized rays entering the element of the 45°-azimuth group are each separated into ordinary and extraordinary rays in a direction tilted with respect to its polarization direction by an angle of 45°. As just described, each of the two polarized rays is equally separated. In a same way as that described above, the ray entering the element of the 45°-azimuth group is separated into two polarized rays, and the two polarized rays entering the element of the 90°-azimuth group are each equally separated. For this reason, alternately arranging the elements of the element of the 90°-azimuth group and the elements of the 45°-azimuth group enables sequential equal ray separation even when the ray first enters any one of the two elements of the 90°- and 45°-azimuth groups.

In contrast, mutually adjacently arranging the elements of the 90°-azimuth group makes a polarization direction of each of the first separated rays identical to a polarization direction for that first separated ray in the next element. In this case, the polarized ray separated by the first element is not separated by the next element, which results only in a positional shift of the extraordinary ray and thereby number of the point images does not increase from two. This applies also to a case of mutually adjacently arranging the elements of the 45°-azimuth group.

For the above-described reasons, it is necessary to alternately, that is, mutually adjacently arrange the elements of the 90°- and 45°-azimuth groups. Such an eight-layer birefringent optical element in which the elements of the 90°- and 45°-azimuth groups are alternately arranged enables separating one incident ray into 256 rays (256 point images).

As described above, A and A', B and B', C and C', and D and D' are each a pair of mutually equivalent ray separation directions, and it is desirable that the ray be separated once in each ray separation direction of each pair (for example, once in A and once in A'). The reason therefor is as follows.

The first reason is that, in the ray separation, the ordinary ray is not shifted and only the extraordinary ray is shifted, and therefore two (first and second) ray separations in an identical direction shifts a centroid of point images. The second ray separation in an opposite direction to that of the first ray separation does not shift the centroid of the point images. Although the centroid shift is a shift of a minute distance approximately equal to a pixel pitch of the image sensor, the centroid shift causes a necessity of shifting a mechanical design including an arrangement of the image sensor and others with respect to the optical axis. Moreover, the centroid shift causes a necessity of maintaining upper, lower, left and right of the optical low-pass filter and further maintaining front and reverse surfaces thereof, which is undesirable.

The second reason is about an incident angle characteristic for the incident ray. Since the optic axis of each birefringent optical element is oblique with respect to the optical axis, the characteristic for a positive incident angle of the incident ray from the optical axis direction and that for a negative incident angle thereof are mutually slightly different (that is, mutually asymmetric). Combining the elements whose ray separation directions are mutually opposite (for example, A and A') cancels out the characteristic difference, which makes the characteristics for the positive and negative incident angles. In particular, when an exit pupil of the image capturing optical system is located close to the image sensor, rays have a large angle at left and right of the image pickup plane of the image sensor, so that the above-mentioned asymmetric characteristics are undesirable.

For these reasons, it is ideal to separate the ray once in all of the ray separation directions A, A', B, B', C, C', D and D'.

In Table 1, DIRECTION 1, DIRECTION 2 and DIRECTION 3 are examples of separating the ray once in all of the ray separation directions and satisfy all the above-described conditions. Order of the ray separation directions can be freely selected as long as the above-described conditions are satisfied. Regardless of the order of the ray separation directions, the optical low-pass filter has an identical performance.

On the other hand, DIRECTION 4 in Table 1 is an example that permits a positional shift of the point images.

Separating the ray twice in each of the four ray separation directions A, B, C and D provides identical point images, which means that the optical low-pass filter has an identical basic performance. For this reason, except for a case of requiring a rigor of the incident angle characteristic, it is no problem to regard the respective paired ray separation directions A and A', B and B', C and C', and D and D' as each being mutually identical. The example shown as DIRECTION 4 is also included in this embodiment.

Moreover, symmetry of the image capturing lens 13 provides a same result as that described above even when the ray enters the optical low-pass filter in a reverse direction to that described above.

Next, description will be made of the ray separation width. Since the distribution of the separated point images has symmetry, the ray separation width L1 is needed to be identical in all of the ray separation directions A, A', B, B', C, C', D and D'. A standard deviation σ showing a dispersion of the separated point mages is proportional to a value of the ray separation width L1. Since a spatial frequency response of the optical low-pass filter varies depending on the dispersion of the separated point images, it is necessary to adjust the standard deviation σ such that the standard deviation σ has an optimum value with respect to a pixel pitch p of the image sensor. Specifically, it is necessary to set the dispersion σ and the pixel pitch p such that their relation satisfies a condition expressed by the following expression (1):

$$0.4 < 2 \times \sigma/P < 0.9. \quad (1)$$

As in this embodiment, in a case of separating the point images in four directions by the eight-layer birefringent optical element, the dispersion σ is as follows:

$$\sigma = L1.$$

In addition, the point images in this case have a distribution like a Gaussian distribution (ideally, have the Gaussian distribution).

Description will be made of these points with reference to FIGS. 5A to 5I by using numerical values. In this embodiment, description will be made of, as an example, a case where the pixel pitch p of the image sensor is 5 μm, the combination of the ray separation directions is DIRECTION 1 in Table 1, and L1 is 2μm.

Figure 5A:
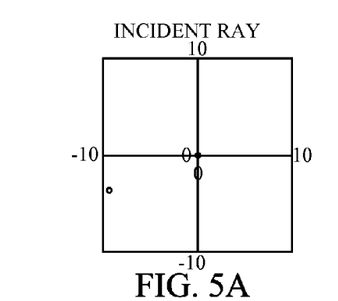
FIGS. 5A to 5I illustrate a distribution of point image separations in Embodiment 1.
Figure 5B:
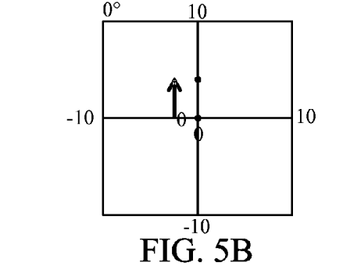

In FIG. 5A, an incident ray (hereinafter referred to also as "an original incident ray") enters the birefringent optical element 1 at its center (0,0). Since the birefringent optical element 1 provides the ray separation direction A (0°) as illustrated in Table 1, as illustrated in FIG. 5B, an ordinary ray is straight transmitted therethrough, and an extraordinary ray is separated upward (in a y direction) from the ordinary ray by a ray separation width L1 of 2 μm. Consequently, the original incident ray is separated into two rays (two point images). In this state, coordinates of the ordinary ray are expressed as (0,0), and coordinates of the extraordinary ray are expressed as (0,2). A polarization direction of the ordinary ray is an x direction, and a polarization direction of the extraordinary ray is the y direction.

Figure 5C:
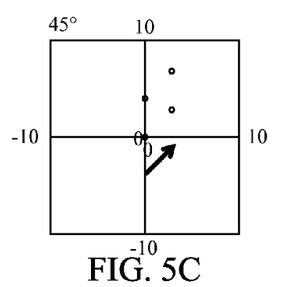

The two rays (ordinary and extraordinary rays) exiting from the birefringent optical element 1 respectively enter the birefringent optical element 2. The birefringent optical element 2 provides the ray separation direction C (45°) which has, as illustrated in FIG. 5C, a tilt of 45° with respect to the polarization directions (see "A" of FIG. 4) of the two rays entering the birefringent optical element 2. As a result, the two rays entering the birefringent optical element 2 are each separated equally into a polarized ray (ordinary ray) having a polarization direction orthogonal to the ray separation direction C and a polarized ray (extraordinary ray) having a polarization direction parallel to the ray separation direction C (see "C" of FIG. 4). The ordinary ray having the polarization direction orthogonal to the ray separation direction C is straight transmitted through the birefringent optical element 2. The extraordinary ray having the polarization direction parallel to the ray separation direction C is shifted in the ray separation direction C by 2 μm. That is, the ray entering the birefringent optical element 2 at (0,0) is separated into two rays proceeding to (0,0) and (√2,√2), and the ray entering the birefringent optical element 2 at (0,2) is separated into two rays proceeding to (0,2) and (√2,2+2√2). As a result, the original incident ray is separated into four rays (four point images).

The polarization directions of the two ordinary rays proceeding to (0,0) and (0,2) are both an azimuth of 135°, and the polarization directions of the two extraordinary rays proceeding to (√2,√2) and (√2,2+2√2) are both an azimuth of 45°.

Figure 5D:
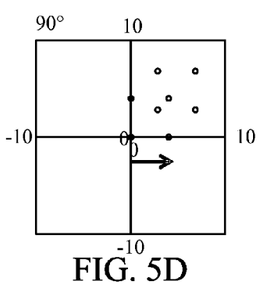

The four rays (the two ordinary rays and the two extraordinary rays) exiting from the birefringent optical element 2 respectively enter the birefringent optical element 3. The birefringent optical element 3 provides the ray separation direction B (90°) which has, as illustrated in FIG. 5D, a tilt of 45° with respect to the polarization directions of the four rays entering the birefringent optical element 3. As a result, the four rays entering the birefringent optical element 3 are respectively separated equally into a polarized ray (ordinary ray) having a polarization direction orthogonal to the ray separation direction B and a polarized ray (extraordinary ray) having a polarization direction parallel to the ray separation direction B (see "B" of FIG. 4). The ordinary ray having the polarization direction orthogonal to the ray separation direction B is straight transmitted through the birefringent optical element 3. The extraordinary ray having the polarization direction parallel to the ray separation direction B is shifted in the ray separation direction B by 2 μm.

That is, the ray entering the birefringent optical element 3 at (0,0) is separated into two rays proceeding to (0,0) and (2,0), and the ray entering the birefringent optical element 3 at (√2,√2) is separated into two rays proceeding to (√2,√2) and (2+√2,√2). On the other hand, the ray entering the birefringent optical element 3 at (0,2) is separated into two rays proceeding to (0,2) and (2,2), and the ray entering the birefringent optical element 3 at (√2,2+√2) is separated into two rays proceeding to (√2, 2+√2) and (2+√2,2+√2). As a result, the original incident ray is separated into eight rays (eight point images).

Figure 5E:
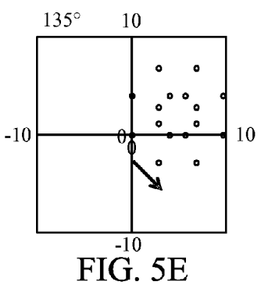
Figure 5F:
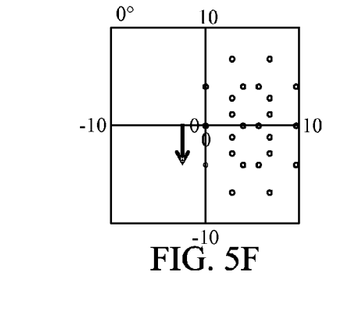
Figure 5G:
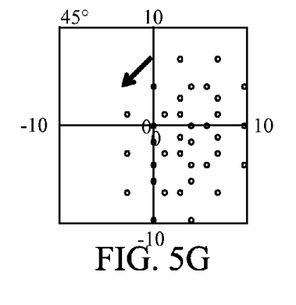
Figure 5H:
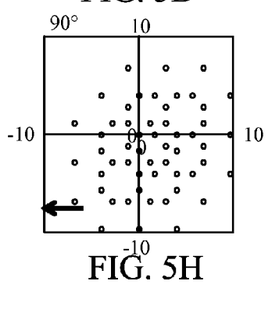

The polarization directions of all these eight rays are an azimuth of 90° or 0°. Accordingly, the eight rays subsequently entering the birefringent optical element 4 providing the ray separation direction D (135°) are each separated equally into two polarized rays as illustrated in FIG. 5E. As a result, the original incident ray is separated into 16 rays (16 point images). Moreover, the ray separation is performed once in each of the four ray separation directions, which results in an octagon-shaped distribution of the point images that is symmetric vertically, horizontally and obliquely.

Figure 5I:
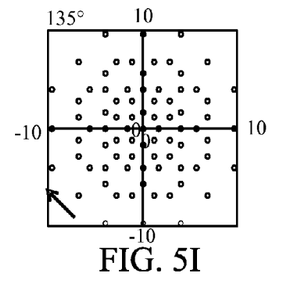
Figure 6:
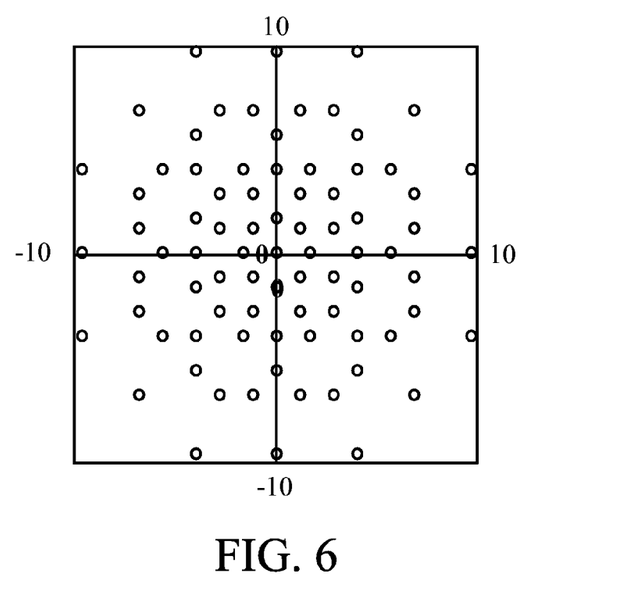
FIG. 6 illustrates a final distribution of the point images in Embodiment 1.

Further separating these 16 rays by the birefringent optical elements 5 to 8 in the ray separation directions A' (180°), C' (225°), B' (270°) and D' (315°) provides, as illustrated in FIGS. 5F to 5I, sequentially separated point images and finally provides 256 point images. The 256 point images have, as illustrated in FIGS. 5I and 6, a distribution shape like the Gaussian distribution (ideally, have a shape of the Gaussian distribution) which is symmetrical in eight directions and whose center coordinates are (0,0). The point images in the Gaussian distribution have a Gaussian-shaped spatial frequency characteristic.

A distribution of equally-spaced point images generated by sequentially separating each point image into two point images is a binominal distribution. Since this embodiment two-dimensionally separates the point images, the resultant distribution thereof is not a strict binominal distribution. However, this embodiment provides, for example in the x direction, separated point images at 0, √2, 2, √2, 0, √2, 2 and √2. Since four-time ray separations are performed at √2, the resultant distribution of the point images is predicted to be a distribution close to the binominal distribution.

Furthermore, it is commonly known that the binominal distribution becomes closer to the Gaussian distribution as number of the ray separations increases.

Although an ideal distribution shape is the shape of the Gaussian distribution, a problem is to cause a distribution of a limited number of discrete point images to approach such a Gaussian distribution as close as possible. This embodiment performs four-time ray separations in each ray separation direction, which results in a distribution of the point images like, that is, close to the Gaussian distribution.

As described below, the optical low-pass filter of this embodiment which performs the eight-time ray separations can achieve a sufficient performance in a two-dimensional point image distribution.

Figure 7:
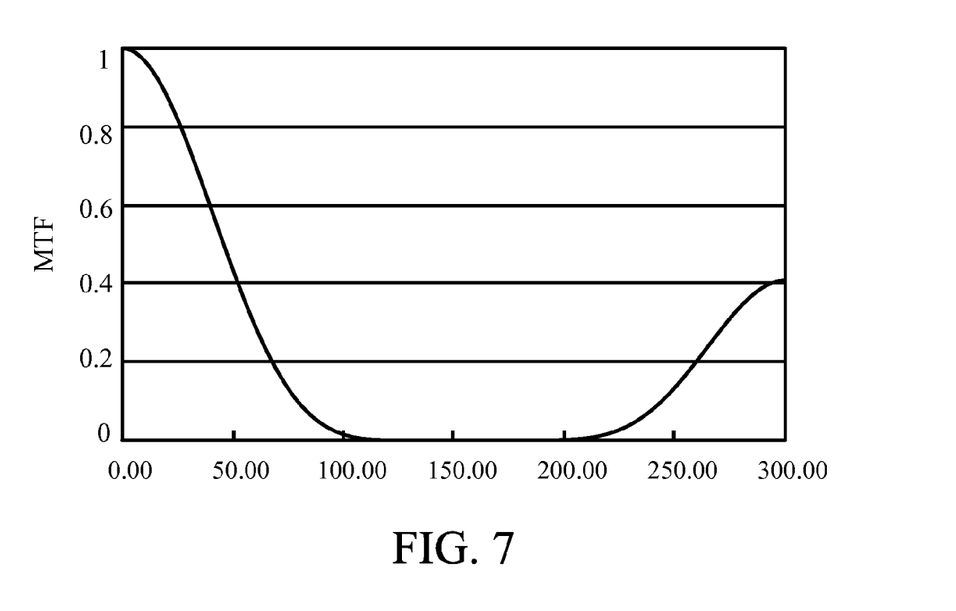
FIG. 7 is a graph illustrating a spatial frequency characteristic of the optical low-pass filter of Embodiment 1.

FIG. 7 illustrates a spatial frequency characteristic of the optical low-pass filter of this embodiment. When the pixel pitch p of the image sensor is 5 μm, a Nyquist frequency of the image sensor is 100 (lp/mm). The optical low-pass filter of this embodiment has an MTF of approximately 0% from around the Nyquist frequency up to around 200 (lp/mm) which is twice of the Nyquist frequency. This means that the optical low-pass filter of this embodiment is a Gaussian low-pass filter with a good performance.

The optical low-pass filter has a response of approximately 40% in a high frequency band around 300 (lp/mm), which becomes no problem in a normal image capturing optical system. A better performance of the optical low-pass filter in the high frequency band can be achieved by increasing number of separation of the point images.

A filter strength of the optical low-pass filter for the image sensor whose pixel pitch p is 5 μm can be adjusted within a range expressed by expression (1). That is, the ray separation width L1 can be selected within a range from 1 μm to 2.25 μm.

Figure 8:
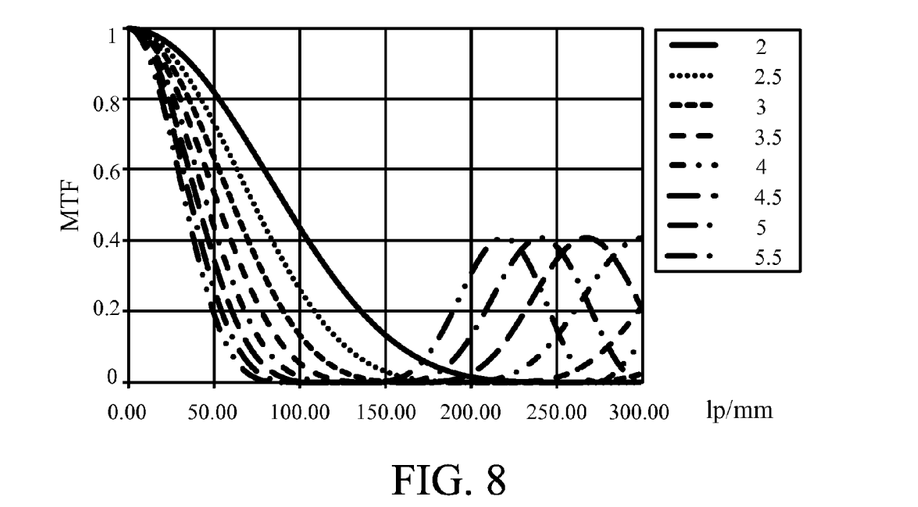
FIG. 8 is a graph illustrating a spatial frequency characteristic of the optical low-pass filter of Embodiment 1 for various separation widths of the point images.

FIG. 8 illustrates a spatial frequency characteristic of the optical low-pass filter corresponding to when the ray separation width L1 is increased from 2 μm to 5.5 μm in 0.5 μm intervals. For instance, setting the ray separation width L1 to be larger than 3 μm decreases contrast in a frequency band lower than the Nyquist frequency. Moreover, in this case, false color and moire fringe are not generated in a frequency band higher than the Nyquist frequency up to approximately 400 (lp/mm).

Therefore, this embodiment can realize an image capturing apparatus provided with an optical low-pass filter capable of suppressing generation of false color and moire fringe in a spatial frequency band around or higher than the Nyquist frequency regardless of an F-number and an entrance position of an incident ray.

Furthermore, satisfying a condition expressed by the following expression (2) enables making an actual shape of the distribution of the point images closer to the shape of the Gaussian distribution (ideal value) that is desirable.

When f(x) and f(y) respectively represent normalized shapes of distributions of the multiple point images in the horizontal direction (first direction) and the vertical direction (second direction) of the image sensor; the normalized shapes are expressed by normalizing these distributions in the horizontal and vertical directions with an area of where the multiple point images are distributed, F(x) represents a cumulative distribution function of the multiple point images, G(x,u,σ) represents an integral value of a Gaussian probability density function of the multiple point images, which is expressed as $g(x,u,\sigma)=1/\sqrt{(2\pi\sigma)}\times\exp-[(x-u)^2/(2\sigma^2)]$, and σx and σy respectively represent standard deviations of the point images in the horizontal and vertical directions, the following condition is satisfied within ranges of $-2\sigma x<x<2\sigma x$ and $-2\sigma y<y<2\sigma y$:

$$G(x, 1/3\sigma x, \sigma x)-0.05<F(x)<G(x, -1/3\sigma x, \sigma x)+0.05. \quad (2)$$

Figure 9:
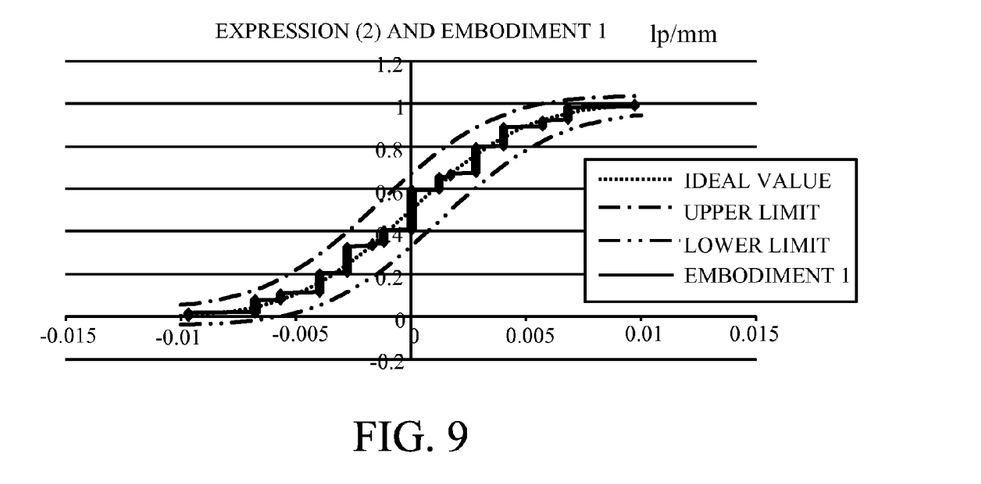
FIG. 9 is a graph illustrating a relation between a range that satisfies expression (2) and Embodiment 1.

The range defined by expression (2) is shown in a graph illustrated in FIG. 9. An ideal distribution shape for the standard deviation σ of the distribution of the point images is expressed by a curve indicating the Gaussian distribution. FIG. 9 illustrates values of F(x) along a vertical axis, and illustrates an upper limit and a lower limit permissible for the ideal distribution shape, which are respectively indicated by a dashed-dotted curve and a dashed-two dotted curve. The distribution of the point images needs to be included in a range between the upper and lower limits.

It is difficult to quantitatively express a distribution of discrete point images. Therefore, in this embodiment the distribution of the point images is expressed by a cumulative distribution function, and furthermore by cumulative distribution functions in the x and y directions. In addition, since the cumulative distribution function shows discrete data, comparison is made by using an integral form of the cumulative distribution function.

Moreover, the cumulative distribution function is expressed by plotting integral values of the point images from a negative side. In this function, a sum of frequencies is standardized by 1. In addition, a horizontal axis of FIG. 9 is defined with a centroid of the point images as an origin.

The point images are located sparsely in regions distant from the origin, which has a minor influence on a whole performance. For this reason, a range that satisfies the condition expressed by expression (2) can be set to a range of ±2σ from the origin.

The upper limit and the lower limit of the condition expressed by expression (2) are respectively set so as to have, with respect to an ideally-shaped distribution of the point images, a margin of ±1/3σ in a direction of the horizontal axis and a margin of ±0.04 in a direction of the vertical axis.

The margin of ±1/3σ in the horizontal axis direction corresponds to a tolerance for positional shifts (errors) of the discrete point images. The condition expressed by expression (2) limits a positional error of the discrete point images particularly around ±σ. The entire cumulative distribution function is standardized by 1 and the condition uses the standard deviation σ of the point images, so that the condition restricts the distribution of the point images from deviating from a Gaussian-shaped curve.

The point images have position direction dispersion. The condition expressed by expression (2) limits the position direction dispersion of the point images to a relatively narrow range of ±1/3σ compared with the Gaussian distribution, which shows that the distribution shape of the point images is close to the Gaussian distribution shape.

On the other hand, the margin of ±0.04 in the vertical axis direction corresponds to a tolerance for a number dispersion (error in number) of the point images. The condition expressed by expression (2) limits the error in number of the point images around ±2σ at which the frequency is particularly low. This embodiment performing the eight-time ray separations provides a total of 256 image points and sets the margin of ±0.04 by assuming that the error in number of the point images is about plus or minus 10 for 256. Since 256 divided by 10 equals 0.039, a number dispersion of approximately plus or minus 10 point images around ±2σ does not affect the whole performance.

Embodiment 2

Figure 10:
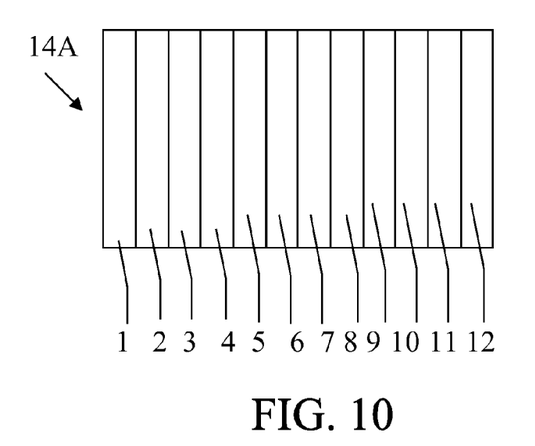
FIG. 10 illustrates a configuration of an optical low-pass filter that is Embodiment 2 of the present invention.

FIG. 10 illustrates a configuration of an optical low-pass filter 14A used for a digital camera that is a second embodiment (Embodiment 2) of the present invention. The optical low-pass filter 14A is constituted by rectangular birefringent optical elements 1 to 12 laminated in twelve layers; each birefringent optical element has a same shape as that of an image pickup plane of an image sensor. These twelve layer birefringent optical elements 1 to 12 are combined to provide a characteristic of the optical low-pass filter 14A.

Table 2 illustrates, as DIRECTIONS 1 to 4, four example combinations of ray separation directions of the birefringent optical elements 1 to 12 forming the twelve layers and constituting the optical low-pass filter 14A. In all of the example combinations, a ray separation width is set to an identical width L2.

TABLE 2

| | DIRECTION 1 | DIRECTION 2 | DIRECTION 3 | DIRECTION 4 | SEPARATION WIDTH L |
|---|---|---|---|---|---|
| 1 | A | A | A | A | L2 |
| 2 | C | D | C | C | L2 |
| 3 | B | B | A' | B | L2 |
| 4 | D | C | C' | D | L2 |
| 5 | A' | B' | B | A | L2 |
| 6 | C' | C' | D | C | L2 |
| 7 | B' | A' | B' | B | L2 |
| 8 | D' | D' | D' | D | L2 |
| 9 | A | B | A | A | L2 |
| 10 | C | D | C | C | L2 |
| 11 | B | A | B | B | L2 |
| 12 | D | C | D | D | L2 |

This embodiment uses three of each of the four elements whose ray separation directions are mutually different. As in Embodiment 1, elements of a 90°-azimuth group and elements of a 45°-azimuth group are alternately arranged. It is desirable that the arrangement include elements whose ray separation directions are mutually opposite, such as A and A'. As in Embodiment 1, since a distribution of separated point images has symmetry, the ray separation width is set to L2 in all of the four ray separation directions.

A numerical calculation derives σ=1/2×L2×√6, though mathematical description thereof is omitted.

In this embodiment, as in Embodiment 1, a pixel pitch p of the image sensor is 5 μm, and the ray separation width L2 is 1.632 μm.

Figure 11:
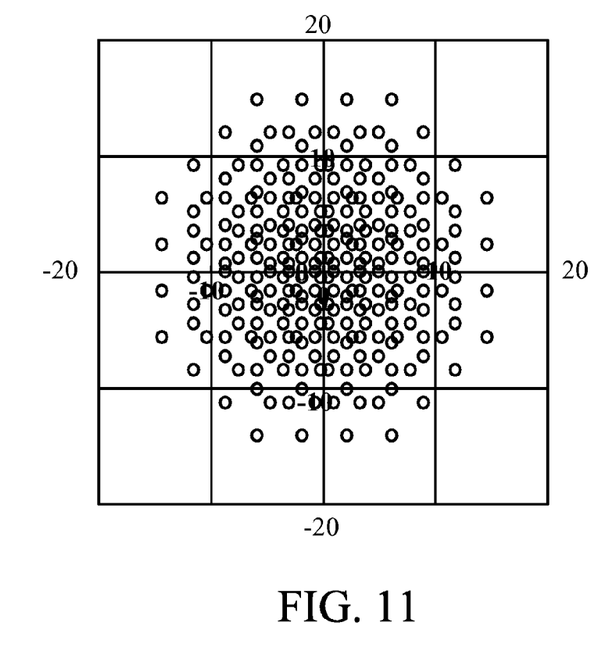
FIG. 11 illustrates a final distribution of point images in Embodiment 2.

The birefringent optical elements 1 to 12 forming the twelve layers each perform a point image separation by the polarization separation effect as in Embodiment 1. As a result, as illustrated in FIG. 11, one ray entering the optical low-pass filter 14A is separated into 4096 point images, which is a twelfth power of two. The twelve-layered elements perform three-time ray separations in each of the separation directions, which makes it impossible to reduce an amount of a positional shift of the point images to zero. For convenience of understanding, FIG. 11 illustrates separated point images whose centroid is shifted to a center after each ray separation. A standard deviation σ of the point images is 2 μm.

Figure 12:
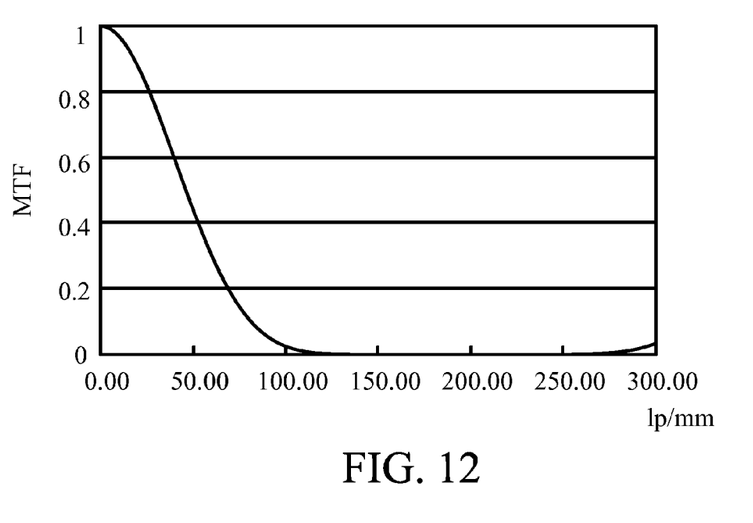
FIG. 12 is a graph illustrating a spatial frequency characteristic of the optical low-pass filter of Embodiment 2.

FIG. 12 illustrates a spatial frequency characteristic of the optical low-pass filter 14A of this embodiment. Since, in this embodiment the standard deviation σ is 2 μm, which is the same as that in Embodiment 1, an MTF response of the optical low-pass filter 14A up to 100 (lp/mm) is approximately equal to the MTF response in Embodiment 1 illustrated in FIG. 7.

Moreover, in this embodiment an MTF is equal to or less than 5% even at a high frequency band of 300 (lp/mm), which enables suppressing generation of false color and moire fringe in a range covering a higher frequency band than that in Embodiment 1.

Embodiment 3

Figure 13:
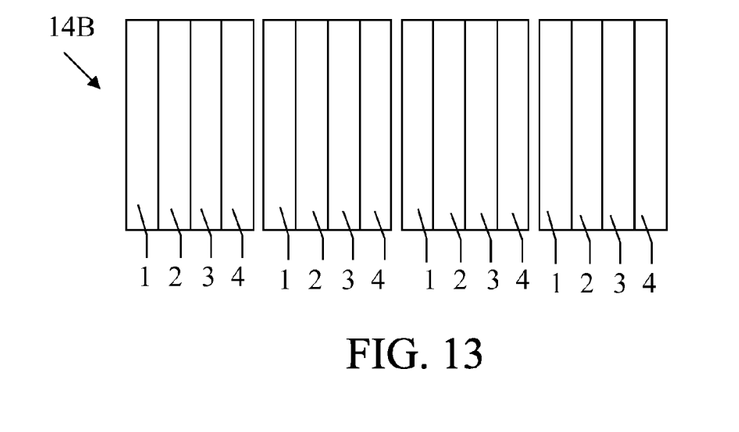
FIG. 13 illustrates a configuration of an optical low-pass filter that is Embodiment 3 of the present invention.

FIG. 13 illustrates a configuration of an optical low-pass filter 14B used for a digital camera that is a third embodiment (Embodiment 3) of the present invention. The optical low-pass filter 14B is constituted by four laminated units each constituted by rectangular birefringent optical elements 1 to 4 laminated in four layers; each birefringent optical element has a same shape as that of an image pickup plane of an image sensor. These sixteen layer birefringent optical elements are combined to provide a characteristic of the optical low-pass filter 14B.

Table 3 illustrates, as DIRECTIONS 1 to 4, four example combinations of ray separation directions of the birefringent optical elements 1 to 4 laminated in four layers and constituting each unit of the optical low-pass filter 14B. A ray separation width is L3 in all of the example combinations.

TABLE 3

| | DIRECTION 1 | DIRECTION 2 | DIRECTION 3 | DIRECTION 4 | SEPARATION WIDTH L |
|---|---|---|---|---|---|
| 1 | A | A | B | B | L3 |
| 2 | C | D | C | D | L3 |
| 3 | B | B | A | A | L3 |
| 4 | D | C | D | C | L3 |

This embodiment uses, for each unit, four elements whose ray separation directions are mutually different. As in Embodiments 1 and 2, elements of a 90°-azimuth group and elements of a 45°-azimuth group are alternately arranged. It is desirable that the arrangement include elements whose ray separation directions are mutually opposite, such as A and A'. In contrast to Embodiments 1 and 2, such an arrangement can be achieved by rotating, with respect to the unit as a reference unit, another unit by 180° about an optical axis. As in Embodiments 1 and 2, since a distribution of separated point images has symmetry, the ray separation width is set to L3 in all of the four ray separation directions.

A numerical calculation derives σ=L3×√2, though mathematical description thereof is omitted.

In this embodiment, as in Embodiments 1 and 2, a pixel pitch p of the image sensor is 5 μm, On the other hand, the ray separation width L3 is 1.414 μm.

A ray transmitted through the four units each constituted by the birefringent optical elements 1 to 4 is separated into point images by the polarization separation action of the optical low-pass filter 14B as well as in Embodiment 1. As a result, one ray entering the optical low-pass filter 14B is separated into 65536 point images, which is a sixteenth power of two. A standard deviation σ of the point images is 2 μm.

Figure 14:
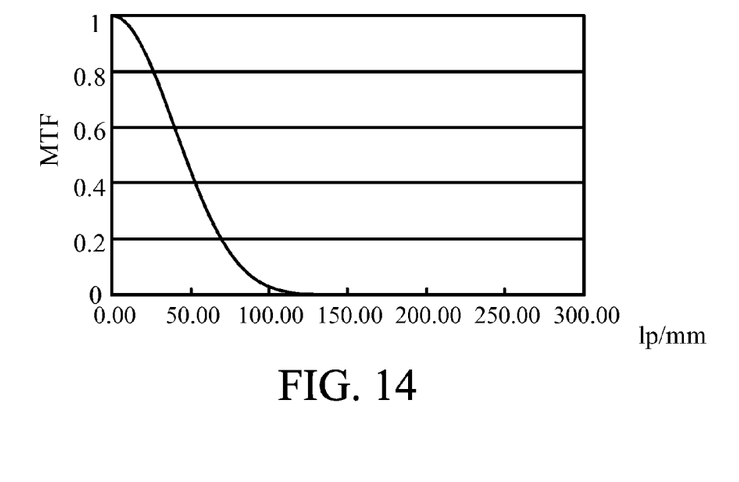
FIG. 14 is a graph illustrating a spatial frequency characteristic of the optical low-pass filter of Embodiment 3.

FIG. 14 illustrates a spatial frequency characteristic of the optical low-pass filter 14B of this embodiment. Since, in this embodiment the standard deviation σ is 2 μm, which is the same as those in Embodiments 1 and 2, an MTF response of the optical low-pass filter 14B up to 100 (lp/mm) is approximately equal to the MTF response in Embodiment 1 illustrated in FIG. 7.

Moreover, in this embodiment the MTF is 0% even at a high frequency band of 300 (lp/mm), which enables realizing an ideal Gaussian optical low-pass filter. The optical low-pass filterer is capable of suppressing generation of false color and moire fringe in a range covering a higher frequency band than that in Embodiment 1.

Theoretically, as the number of layers formed by the birefringent optical elements increases, the distribution of point images becomes closer to the Gaussian distribution. When assuming that each unit in this embodiment is constituted by elements laminated in n layers and a ray separation width is L, the point images have a standard deviation σ of $L \times \sqrt{(n/2)}$. Conversely, when requiring the standard deviation σ of 2 μm, setting the ray separation width L to $\sigma \times \sqrt{(2/n)}$ can provide that standard deviation σ. Embodiment 1 corresponds to a case where n is 2, Embodiment 2 corresponds to a case where n is 3, and Embodiment 3 corresponds to a case where n is 4.

A summary description will be made of conditions that each embodiment of the present invention including Embodiments 1 to 3 described above needs to satisfy.

First, it is desirable that the optical low-pass filter separate one incident ray at least six times, and separate the one incident ray four or more times among the six times, in at least each of the first and second directions.

Secondly, it is desirable that the optical low-pass filter separate the one incident ray at least eight times. Moreover, among the at least eight-time ray separations, separation directions of each of four-time ray separations are first grouped directions (90°-azimuth group) including two mutually orthogonal directions, and separation directions of each of other four-time ray separations are second grouped directions (45°-azimuth group) including two mutually orthogonal directions not orthogonal to the two directions of the first grouped directions. In this case, it is desirable that the optical low-pass filter separate the one incident ray in the two directions included in the first grouped directions and then separate the respective separated rays in the two directions of the second grouped directions.

Furthermore, it is desirable that, when one of the ray separation directions of the incident ray is defined as 0°, the optical low-pass filter separate the one incident ray at least twice in each of four directions of 0°, 45°±10°, 90°±10° and 135°±10°.

COMPARATIVE EXAMPLE

Figure 15A:
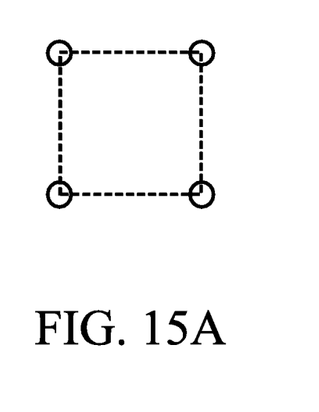
FIGS. 15A and 15B illustrate a configuration of an optical low-pass filter that is a comparative example that separates a ray into four point images.
Figure 15B:
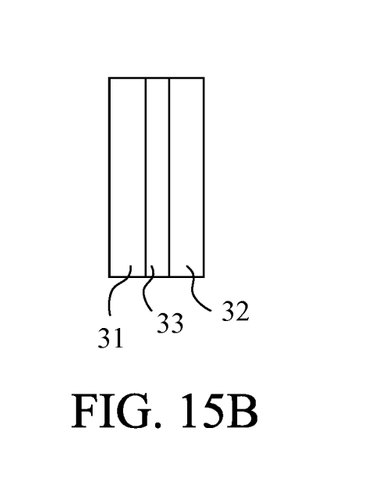

FIG. 15A illustrates, as a comparative example, four separated point images formed by a four-point separation optical low-pass filter currently commonly used for single-reflex digital cameras. FIG. 15B illustrates a configuration of the optical low-pass filter. The optical low-pass filter is constituted by two birefringent optical elements 31 and 32 whose separation directions are mutually orthogonal and a 1/4λ plate 33 disposed therebetween.

Figure 16:
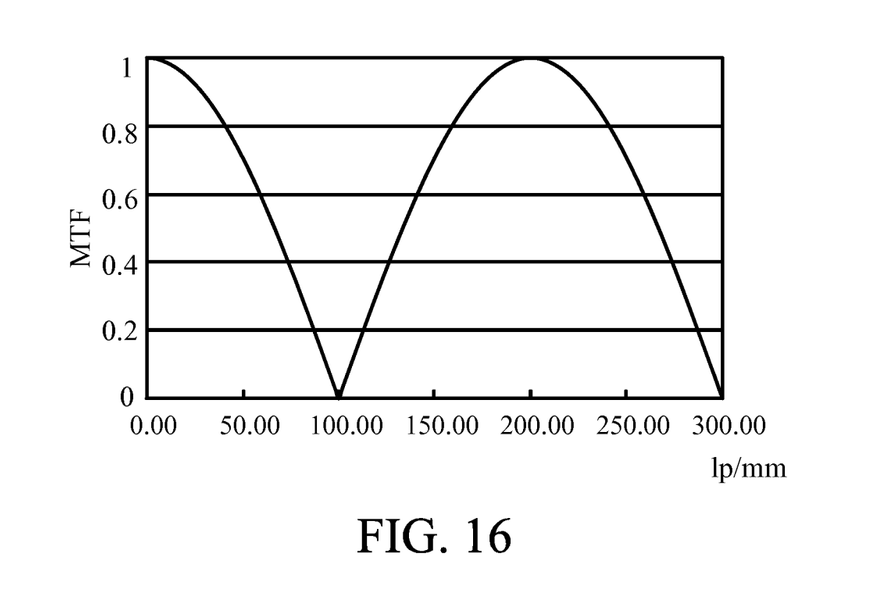
FIG. 16 is a graph illustrating a spatial frequency characteristic of the optical low-pass filter of the comparative example.

FIG. 16 illustrates a spatial frequency characteristic of the optical low-pass filter. In the drawing, a value of an MTF of the optical low-pass filter reduces from 100% to 0% at a spatial frequency of 1/2×L (100 lp/mm), increases on a higher-frequency side than 1/2×L and again reaches 100% at a spatial frequency of 1/L (200 lp/mm). This spatial frequency characteristic indicates that the optical low-pass filter of the comparative example cannot provide an effect of suppressing generation of false color and moire fringe in a high-frequency-side band that the optical low-pass filters 14, 14A and 14B of Embodiments 1 to 3 can provide.

According to each of the above-described embodiments, using an optical low-pass filter that satisfies at least the condition expressed by expression (1) enables realizing an image capturing apparatus capable of suppressing generation of false color and moire fringe in a spatial frequency band around or higher than a Nyquist frequency regardless of an F-number and an entrance position of an incident ray.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2014-085278, filed on Apr. 17, 2014, and 2015-081236 filed on Apr. 10, 2015, which are hereby incorporated by reference herein in their entirety.

What is claimed is:

1. An image capturing apparatus comprising:
    an optical low-pass filter configured to separate one incident ray into multiple rays to form multiple point images; and
    an image sensor configured to photoelectrically convert the multiple point images,
    wherein the optical low-pass filter satisfies the following condition:

$$0.4 < 2 \times \sigma / P < 0.9$$

where P represents a pixel pitch of the image sensor, and σ represents a standard deviation of a distribution of the multiple point images, and
    wherein the optical low-pass filter is configured to separate the one incident ray, when one of the separation directions thereof is defined as 0°, in each of four directions of 0°, 45°±10°, 90°±10°, and 135°±10°.

2. An image capturing apparatus according to claim 1, wherein the distribution of the multiple point images is a distribution like a Gaussian distribution.

3. An image capturing apparatus according to claim 1, wherein the optical low-pass filter is configured to:
    separate the one incident ray at least six times; and
    separate the one incident ray four or more times among the six times, in at least each of a long-side direction and a short-side direction of the image sensor.

4. An image capturing apparatus according to claim 1, wherein:
    the optical low-pass filter is configured to separate the one incident ray at least eight times, and
    among the at least eight-time separations, separation directions of each of four-time separations are first grouped directions including two mutually orthogonal directions, and separation directions of each of other four-time separations are second grouped directions including two mutually orthogonal directions not orthogonal to the two directions of the first grouped directions.

5. An image capturing apparatus according to claim 4, wherein the optical low-pass filter is configured to separate the one incident ray in the two directions included in the first grouped directions and then separate the respective separated rays in the two directions of the second grouped directions.

6. An image capturing apparatus according to claim 4, wherein the optical low-pass filter is configured to separate the one incident ray at least twice in each of four directions of 0°, 45°±10°, 90°±10°, and 135°±10°.

7. An image capturing apparatus according to claim 1, wherein the following condition is satisfied within ranges of $-2\sigma x < x < 2\sigma x$ and $-2\sigma y < y < 2\sigma y$:

$$G(x, 1/3\sigma x, \sigma x)-0.05 < F(x) < G(x, -1/3\sigma x, \sigma x)+0.05$$

where:
- f(x) and f(y) respectively represent normalized shapes of distributions of the multiple point images in a first direction and a second direction of a long-side direction and a short-side direction of the image sensor, the normalized shapes being expressed by normalizing the distributions in the first and second directions with an area of where the multiple point images are distributed,
- F(x) represents a cumulative distribution function of the multiple point images,
- G(x,u,σ) represents an integral value of a Gaussian probability density function of the multiple point images, which is expressed as:

$$g(x,u,\sigma)=1/\sqrt{(2\pi\sigma)}\times\exp[-(x-u)^2/(2\sigma^2)], \text{ and}$$

σx and σx respectively represent standard deviations of the multiple point images in the first and second directions.

8. An image capturing apparatus according to claim 1, wherein the optical low-pass filter is configured to separate the one incident ray by using a polarization separation effect provided by an anisotropic material.

9. An image capturing apparatus comprising:
- an optical low-pass filter configured to separate one incident ray into multiple rays to form multiple point images; and
- an image sensor configured to photoelectrically convert the multiple point images, wherein the distribution of the multiple point images is a distribution like a Gaussian distribution, and
wherein the optical low-pass filter satisfies the following condition:

$$0.4 < 2\times\sigma/P < 0.9$$

where P represents a pixel pitch of the image sensor, and σ represents a standard deviation of a distribution of the multiple point images.

10. An image capturing apparatus comprising:
- an optical low-pass filter configured to separate one incident ray into multiple rays to form multiple point images; and
- an image sensor configured to photoelectrically convert the multiple point images, wherein the optical low-pass filter satisfies the following condition:

$$0.4 < 2\times\sigma/P < 0.9$$

where P represents a pixel pitch of the image sensor, and σ represents a standard deviation of a distribution of the multiple point images, and
wherein the following condition is satisfied within ranges of $-2\sigma x < x < 2\sigma x$ and $-2\sigma y < y < 2\sigma y$:

$$G(x, 1/3\sigma x, \sigma x)-0.05 < F(x) < G(x, -1/3\sigma x, \sigma x)+0.05$$

where:
- f(x) and f(y) respectively represent normalized shapes of distributions of the multiple point images in a first direction and a second direction of a long-side direction and a short-side direction of the image sensor, the normalized shapes being expressed by normalizing the distributions in the first and second directions with an area of where the multiple point images are distributed,
- F(x) represents a cumulative distribution function of the multiple point images,
- G(x,u,σ) represents an integral value of a Gaussian probability density function of the multiple point images, which is expressed as:

$$g(x,u,\sigma)=1/\sqrt{(2\pi\sigma)}\times\exp[-(x-u)^2/(2\sigma^2)], \text{ and}$$

σx and σy respectively represent standard deviations of the multiple point images in the first and second directions.

\* \* \* \* \*